(12) United States Patent
Valtchev et al.

(10) Patent No.: US 12,090,471 B2
(45) Date of Patent: Sep. 17, 2024

(54) POST-SYNTHETIC DOWNSIZING ZEOLITE-TYPE CRYSTALS AND/OR AGGLOMERATES THEREOF TO NANOSIZED PARTICLES

(71) Applicants: Centre National de la Recherche Scientifique, Paris (FR); École Nationale Supérieure d'Ingénieurs de Caen, Caen (FR); Université de Caen Normandie, Caen (FR)

(72) Inventors: Valentin Valtchev, Basly (FR); Kamila Goldyn, Aberystwyth (GB); Svetlana Mintova Lazarova, Basly (FR); Jean-Pierre Gilson, Cairon (FR)

(73) Assignees: Centre National de la Recherche Scientifique, Paris (FR); École Nationale Supérieure d'Ingénieurs de Caen, Caen (FR); Université de Caen Normandie, Caen (FR)

( * ) Notice: Subject to any disclaimer, the term of this patent is extended or adjusted under 35 U.S.C. 154(b) by 602 days.

(21) Appl. No.: 17/293,886

(22) PCT Filed: Nov. 14, 2019

(86) PCT No.: PCT/EP2019/081411
§ 371 (c)(1),
(2) Date: May 13, 2021

(87) PCT Pub. No.: WO2020/099604
PCT Pub. Date: May 22, 2020

(65) Prior Publication Data
US 2022/0008901 A1    Jan. 13, 2022

(30) Foreign Application Priority Data
Nov. 15, 2018   (EP) ..................... 18306502

(51) Int. Cl.
*B01J 29/18* (2006.01)
*B01J 29/08* (2006.01)
(Continued)

(52) U.S. Cl.
CPC ............ *B01J 29/18* (2013.01); *B01J 29/084* (2013.01); *B01J 29/60* (2013.01); *B01J 29/7003* (2013.01);
(Continued)

(58) Field of Classification Search
USPC ........................................... 423/717
See application file for complete search history.

(56) References Cited

U.S. PATENT DOCUMENTS 4,346,051 A * 8/1982 McFarlin ................ F04B 37/08
264/102

FOREIGN PATENT DOCUMENTS

| CN | 107285332 A | * 10/2017 | ............ C01B 39/04 |
| FR | 3013235 A1 | * 5/2015 | ............ B01J 20/183 |

(Continued)

OTHER PUBLICATIONS

English translation of CN-107285332-A Description (Year: 2017).*
(Continued)

*Primary Examiner* — Anthony J Zimmer
*Assistant Examiner* — Zachary John Baum
(74) *Attorney, Agent, or Firm* — Conley Rose, P.C.

(57) ABSTRACT

The present invention relates to a method of post-synthetic downsizing zeolite-type crystals and/or agglomerates thereof to nanosized particles, and in particular a heating-free and chemical-free method. The present invention also relates to nanosized particles of zeolite-type material capable of being obtained by the method of the invention and to the use of such particles as a catalyst or catalyst
(Continued)

support for heterogeneous catalyst, or as molecular sieve, or as a cation exchanger.

8 Claims, 16 Drawing Sheets

(51) Int. Cl.
    B01J 29/60      (2006.01)
    B01J 29/70      (2006.01)
    B01J 39/14      (2006.01)
    C01B 39/02      (2006.01)
(52) U.S. Cl.
    CPC .......... *B01J 29/7042* (2013.01); *B01J 39/14* (2013.01); *C01B 39/026* (2013.01); *C01P 2002/72* (2013.01); *C01P 2002/82* (2013.01); *C01P 2002/86* (2013.01); *C01P 2004/03* (2013.01); *C01P 2004/10* (2013.01)

(56) References Cited

FOREIGN PATENT DOCUMENTS

| GB | 1316311 A | * | 5/1973 | ................ B01J 2/22 |
|----|-----------|---|--------|-----------------------------|
| WO | 03006369 A1 |   | 1/2003 | |
| WO | 2009123556 A1 |   | 10/2009 | |
| WO | 2020099604 A1 |   | 5/2020 | |

OTHER PUBLICATIONS

English translation of FR-3013235-A1 Description (Year: 2015).*
Rutter, M.D., et al. Investigation of pressure-induced amorphization in hydrated zeolite Li-A and Na-A using synchrotron X-ray diffraction. Journal of Physics and Chemistry of Solids 62 (2001) 599-606. (Year: 2001).*
Lee, Y., et al. Phase transition of zeolite RHO at high-pressure. J. Am. Chem. Soc. 2001, 123, 8418-8419. (Year: 2001).*
Colligan, M., et al. Synchrotron X-ray powder diffraction and computational investigation of purely siliceous Zeolite Y under pressure. J. Am. Chem. Soc. 2004, 126, 12015-12022. (Year: 2004).*
Foreign Communication from a Related Counterpart Application, International Search Report and Written Opinion dated Jan. 21, 2020, International Application No. PCT/EP2019/081411 filed on Nov. 14, 2019.
Anas K. Jamil, et al. "Selective Production of Propylene from Methanol Coversion over Nanosized ZSM-22 Zeolites", Industrial & Engineering Cheistry Research, vol. 53, No. 50, Dec. 5, 2014, pp. 19498-19505, XP055432808, ISSN: 0888-5885, DOI: 10.1021/ie5038006.
Wolfgang Lutz, et al.: "Formation of Mesopores in USY Zeolites: A Case Revisited", Zeitschrift Fur Anorganische Und Allgemeine Chemie, vol. 636, No. 8, Mar. 12, 2010, pp. 1497-1505, XP055578187, ISSN: 0044-2313, DOI: 10.1002/zaac.201000025.
Michael Mazur, et al. "Pressure-induced chemistry for the 2D to 3D transformation of zeolites", Journal of Materials Chemistry A, vol. 6, No. 13, Nov. 20, 2017, pp. 5255-5259, XP055578194, ISSN: 2050-7488, DOI: 10.1039/C7TA09248B.
C.R. Marcilly, "Where and how shape selectivity of molecular sieves operates in refining and petrochemistry catalytic processes" Topics in Catalysis 13 (2000) pp. 357-366.
N.Y. Chen, T.F. Degnan, C. Morris, Book Review "Molecular Transport and Reaction in Zeolites", VCH, Weinheim 1994.
G. Melinte, V. Georgieva, M.A. Springuel-Huet, A. Nossov, O. Ersen, F. Guenneau, A. Gedeon, A. Palelc, K.N. Bozhilov, C. Pham-Huu, S. Qiu, S. Mintova, V. Valtchev, "3D Study of the Morphology and Dynamics of Zeolite Nucleation" Chem. A European Journal 21 (2015) pp. 18316-18327.

H. Awala, J.P. Gilson, R. Retoux, P. Boullay, J.M. Goupil, V. Valtchev, S. Mintova, "Template-free nanosized faujasite-type zeolites" Nature Materials 14 (2015) DOI: 10.1038/NMAT4173.
B.J. Schoeman, J. Sterte, J.E. Otterstedt, "The synthesis of colloidal zeolite hydroxysodalite sols by homogeneous nucleation" Zeolites, vol. 14 (1994) pp. 208-216.
M.A. Camblor, A. Corma, A. Mifsud, J. Perez-Pariente, S. Valencia, "Synthesis of nanocrystalline zeolite Beta in the absence of alkali metal cations" Studies in Surface Science and Catalysis, vol. 105 (1997) pp. 341-348.
V. Valtchev, G. Majano, S. Mintova, J. Perez-Ramirez, "Tailored crystalline microporous materials by post-synthesis modification" Chem. Soc. Rev. 42 (2013) pp. 263-290, DOI: 10.1039/c2cs35196j.
Y. Wei, T. E. Parmentier, K.P. de Jong, J. Zecevic, "Tailoring and visualizing the pore architecture of hierarchical zeolites" Chem. Soc. Rev. 44 (2015) pp. 7234-7261, DOI: 10.1039/c5cs00155b.
A. Sachse, J. Garcia-Martinez, "Surfactant-Templating of Zeolites: From Design to Application" Chemistry of Materials, 29 (2017) pp. 3827-3853, DOI: 10.1021/acs.chemmater.7b00599.
T. Wakihara, K. Sato, S. Inagaki, J. Tatami, K. Komeya, T. Meguro, Y. Kubota, "Fabrication of Fine Zeolite with Improved Catalytic Properties by Bead Milling and Alkali Treatment" American Chemical Society Applied Materials Interfaces 2 (2010) pp. 2715-2718, DOI: 10.1021/am100642.
T. Wakihara, R. Ichikawa, J. Tatami, A. Endo, K. Yoshida, Y. Sasaki, K. Komeya, T. Meguro, "Bead-Milling and Postmilling Recrystallization: An Organic Template-free Methodology for the Production of Nano-zeolites" Crystal Growth and Design, 11 (2011) 955-958, dx.doi.org/10.1021/cg2001656.
Z. Liu, N. Nomura, D. Nishioka, Y. Hotta, T. Matsuo, K. Oshima, Y. Yanaba, T. Yoshikawa, K. Ohara, S. Kohara, T. Takewaki, T. Okubo, T. Wakihara, "A top-down methodology for ultrafast tuning of nanosized zeolites" Chem. Commun. 51 (2015) pp. 12567-12570, DOI: 10.1039/c5cc04542h.
Z. Qin, G. Melinte, J.P. Gilson, M. Jaber, K. Bozhilov, P. Boullay, S. Mintova, O. Ersen, V. Valtchev, "The Mosaic Structure of Zeolite Crystals" Angew. Chemie—Int. Ed. 55 (2016) pp. 15049-15052, DOI: 10.1002/anie.201608417.
X. Chen, T. Todorova, A. Vimont, V. Ruaux, Z. Qin, J.P. Gilson, V. Valtchev, "In situ and post-synthesis control of physicochemical properties of FER-type crystals" Microporous and Mesoporous Materials, 200 (2014) pp. 334-342.
D. Verboekend. K. Thomas, M. Milina, S. Mitchell, J. Perez-Ramirez, J.P. Gilson, "Towards more efficient monodimensional zeolite catalysts: n-alkane hydro-isomerisation on hierarchical ZSM-22" Catalysis Science Technology 1 (2011) 1331, DOI: 10.1039/c1cy00240f.
J.A. Martens, D. Verboekend, K. Thomas, G. Vanbutsele, J. Perez-Ramirez, J. P. Gilson, "Hydroisomerization and hydrocracking of linear and multibranchedlong model alkanes on hierarchical Pt/ZSM-22 zeolite" Catalysis Today 218-219 (2013) 135-142.
A. Vimont, J. Lavalley, L. Francke, A. Demourgues, A. Tressaud, M. Daturi, "Infrared Study of the Surface Properties of HTB-Type Al-, Cr-, Fe-Hydroxyfluorides" Journal of Phys. Chem. B 108 (2004) pp. 3246-3255.
T. Onfroy, G. Clet, M. Houalla, "Quantitative IR characterization of the acidity of various oxide catalysts" Microporous and Mesoporous Materials 82 (2005) pp. 99-104, doi:10.1016/j.micromeso.2005.02.020.
T. F. Degnan, C. R. Kennedy, "Impact of Catalyst Acid/Metal Balance in Hydroisomerization of Normal Paraffins" AIChE J. 39 (1993).
D. Verboekend, A. M. Chabaneix, K. Thomas, J. P. Gilson, J. "Mesoporous ZSM-22 zeolite obtained by desilication: peculiarities associated with crystal morphology and aluminium distribution" Perez-Ramirez, CrystEngComm 10 (2011) 340, DOI: 10.1039/c0ce00966k.
C. Martinez, A. Corma, Coordination Chemistry Review 255 (2011) pp. 1558-1580, DOI: 10.1016/j.ccr.2011.03.014.
W. Vermeiren, J.P. Gilson, "Impact of Zeolites on the Petroleum and Petrochemical Industry", Top. Catal. 52 (2009) pp. 1131-1161, DOI: 10.1007/s11244-009-9271-8.

(56) References Cited

OTHER PUBLICATIONS

V. Valtchev, L. Tosheva, "Porous Nanosized Particles: Preparation, Properties, and Applications", Chemical Reviews, 113 (2013) pp. 6734-6760, dx.doi.org/10.1021/cr300439k.

J. Perez-Ramirez, C.H. Christensen, K. Egeblad, C.H. Christensen, J.C. Groen, "Hierarchical zeolites: enhanced utilisation of microporous crystals in catalysis by advances in materials design", Chemical Society Reviews, 37 (2008) pp. 2530-2542.

M. Smaihi, O. Barida, V. Valtchev, "Investigation of the Crystallization Stages of LTA-Type Zeolite by Complementary Characterization Techniques", Eur. J. Inorg. Chem. (2003) pp. 4370-4377, DOI: 10.1002/ejic.200300154.

A. Stolle, T. Szuppa, S. E. S. Leonhardt, B. Ondruschka, "Ball milling in organic synthesis: solutions and challenges", Chem. Soc. Rev. 40 (2011) pp. 2317-2329, DOI: 10.1039/c0cs00195c.

E. Boldyreva, "Mechanochemistry of inorganic and organic systems: what is similar, what is different?", Chem. Soc. Rev. 42 (2013) 7719, DOI: 10.1039/c3cs60052a.

V. Valtchev, S. Mintova, D. Radev, V. Dimov, A. Toneva, "Tribochemical activation of seeds for rapid crystallization of zeolite Y" Zeolites, 1995.

J. A. Martens, W. Souverijns, W. Varrelst, R. Parton, G. F. Froment, P. A. Jacobs, "Selective Isomerization of Hydrocarbon Chains on External Surfaces of Zeolite Crystals" Angew. Chemie—Int. Ed. 34 (1994) 20-22.

M. Thommes, K.A. Cychosz, "Physical adsorption characterization of nanoporous materials: progress and challenges" Adsorption 20 (2014) pp. 233-250.

J.A. van Bokhoven, A. L. Roest, D.C. Koningsberger, J. T. Miller, G. H. Nachtegaal, A.P.M Kentgens, "Changes in Structural and Electronic Properties of the Zeolite Framework Induced by Extraframework Al and La in H-USY and La (x)NaY: A 29Si and 27Al MAS NMR and 27Al MQ MAS NMR Study" J. Phys. Chem. B 104 (2000) pp. 6743-6754, 10.1021/jp000147c.

M. Hunger, G. Engelhardt, J. Weitkamp, "Solid-state 23Na, 139La, 27Al and 29Si nuclear magnetic resonance spectroscopic investigations of cation location and migration in zeolites LaNaY" Microporous Mater. 3 (1995) pp. 497-510.

* cited by examiner

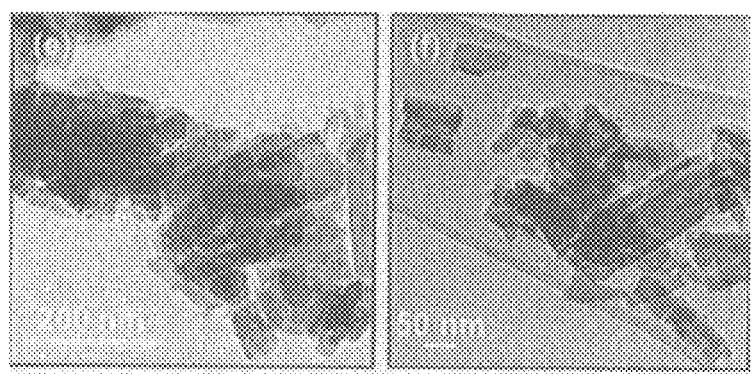
FIG. 2e	FIG. 2f
FIG. 3
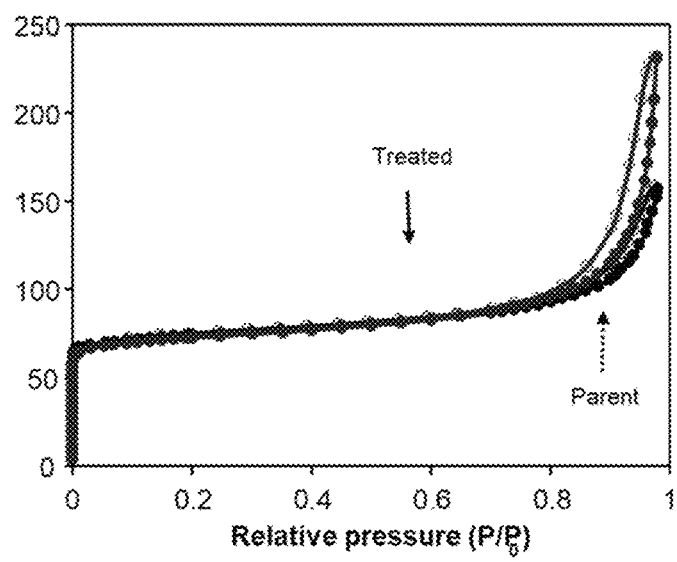
FIG. 4
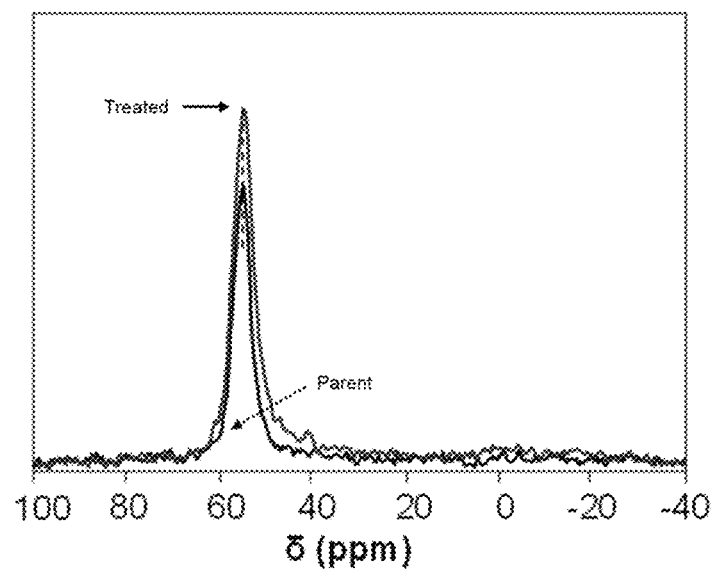

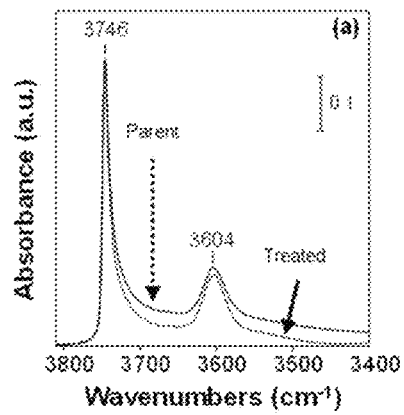
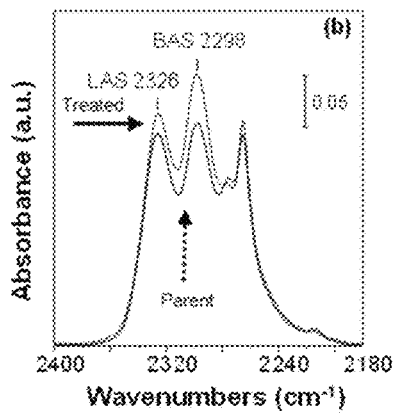
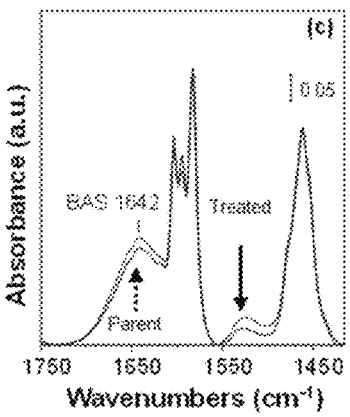
FIG. 5a                FIG. 5b                FIG. 5c
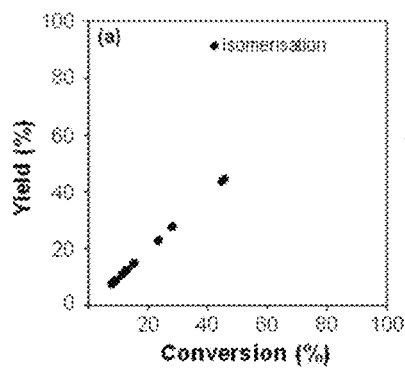
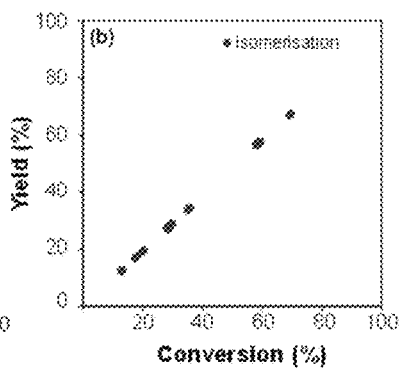
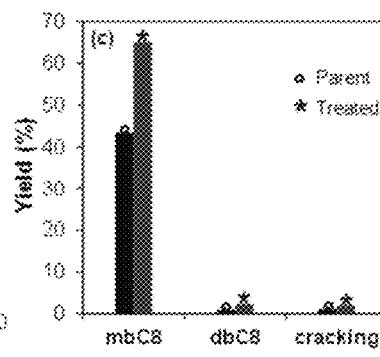
FIG. 6a                FIG. 6b                FIG. 6c

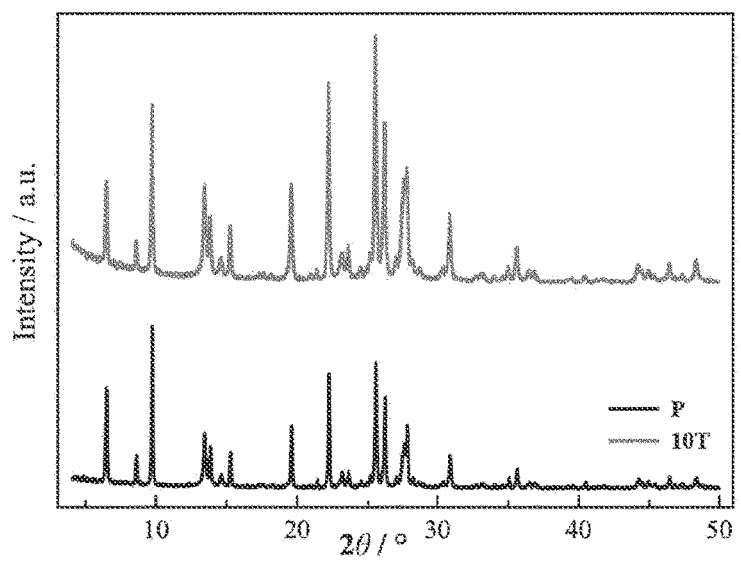
FIG. 9
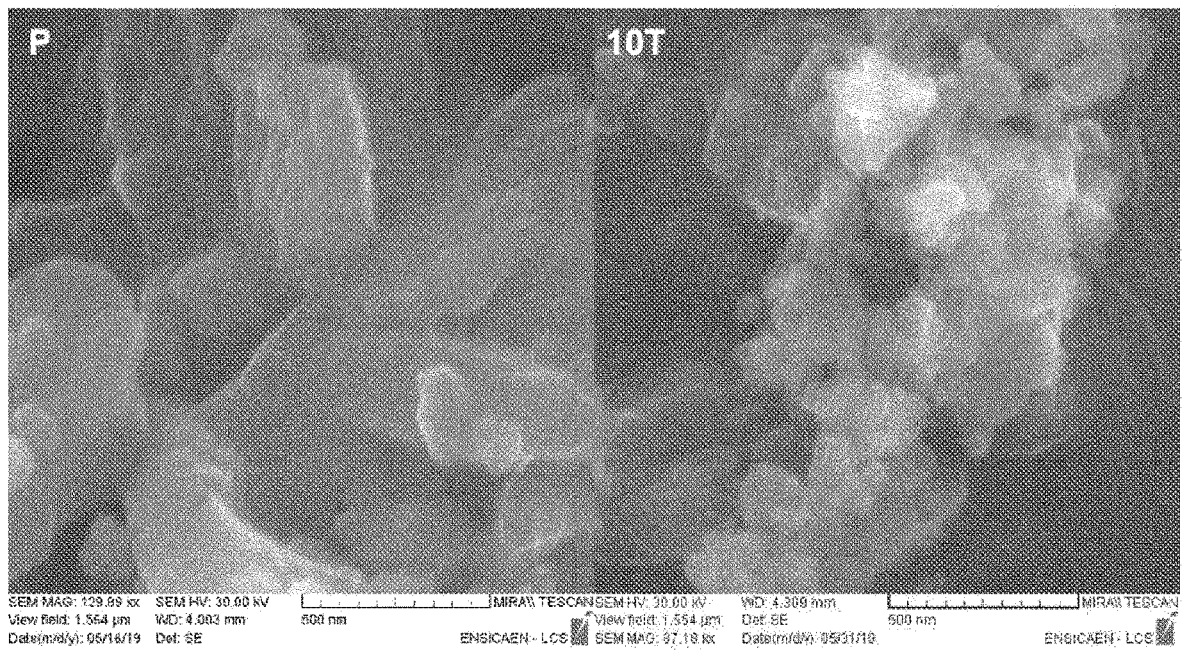
FIG. 10A
FIG. 10B

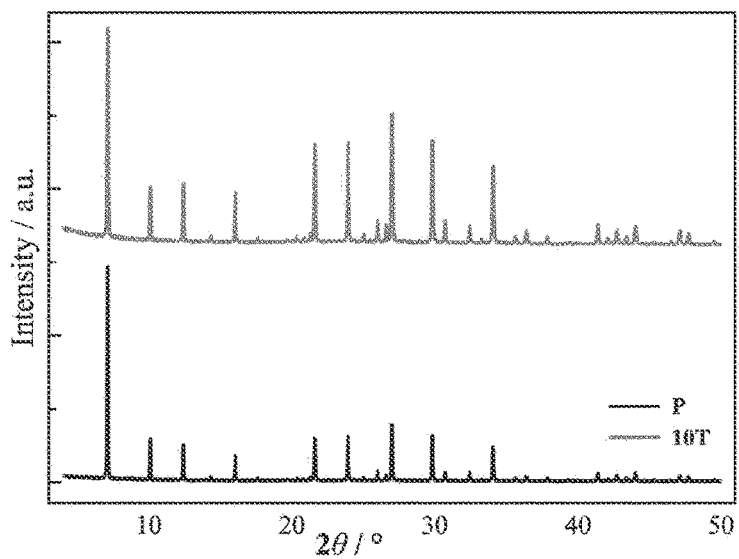
FIG. 21
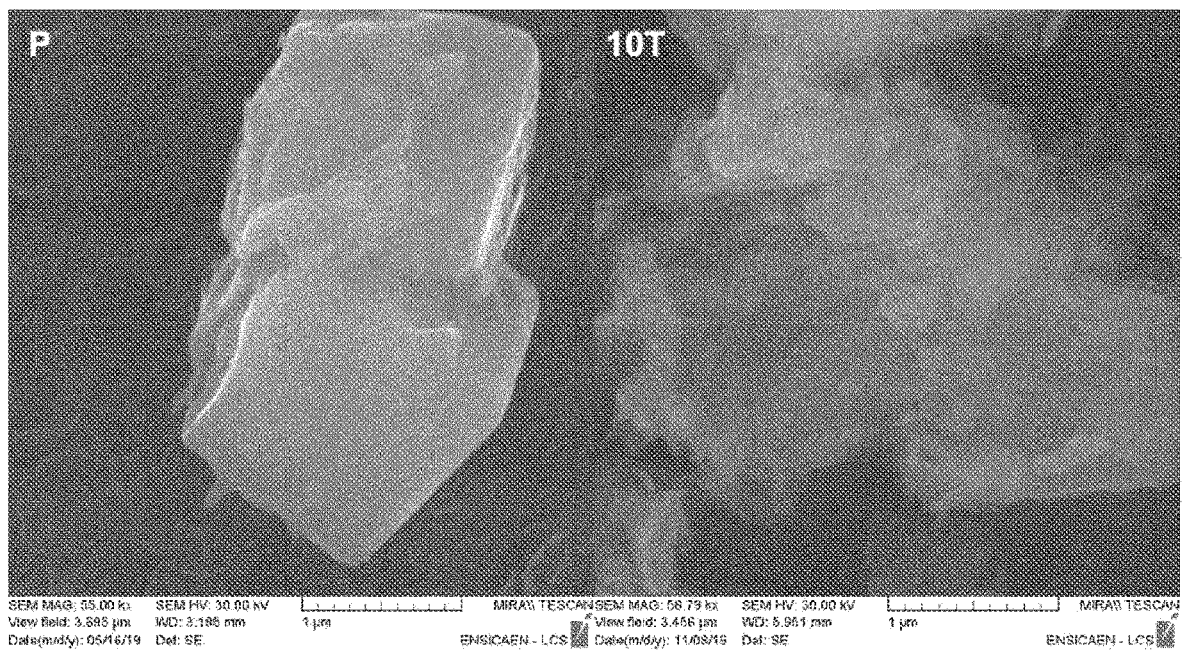
FIG. 22A
FIG. 22B

POST-SYNTHETIC DOWNSIZING ZEOLITE-TYPE CRYSTALS AND/OR AGGLOMERATES THEREOF TO NANOSIZED PARTICLES

CROSS-REFERENCE TO RELATED APPLICATIONS

The present application is a filing under 35 U.S.C. 371 as the National Stage of International Application No. PCT/EP2019/081411, filed Nov. 14, 2019, entitled "POST-SYNTHETIC DOWNSIZING ZEOLITE-TYPE CRYSTALS AND/OR AGGLOMERATES THEREOF TO NANOSIZED PARTICLES," which claims priority to European Application No. 18306502.8 of filed with the European Patent Office on Nov. 15, 2018, both of which are incorporated herein by reference in their entirety for all purposes.

FIELD OF THE INVENTION

The present invention relates to a method of post-synthetic downsizing zeolite-type crystals and/or agglomerates thereof to nanosized particles, and in particular a heating-free and chemical-free method.

BACKGROUND

The most important zeolite applications lay in the field of catalysis, gas separation and ion exchange owing to their high specific surface area, tunable active sites and high thermal/chemical stability[1,2]. In addition, these crystalline microporous materials offer unique nanoreactors where confinement and shape selectivity provide remarkable selectivities to transform, for instance, hydrocarbons to valuable products[3,4].

Unfortunately, their exceptional shape selectivity comes at the expense of restricted diffusion, lowering their product space time yield (moles of desired products per packed bed volume and time)[5]. The reasons are two-fold: i) a limited accessibility to their active sites, and ii) pore blocking and/or site coverage leading to catalysts deactivation, the latter especially problematic on so-called one-dimensional zeolites.

Therefore, to use their full potential, it is important to tailor the physical features of zeolite crystal to decrease the impact of diffusion limitations, i.e. lowering the Thiele modulus of the reaction[6]. During the last decade two major approaches were explored and some commercially deployed i) decrease of the crystal size to nano-dimensions by modification of synthesis conditions[7] (the so-called bottom-up approaches) and ii) post-synthesis biased chemical etching of zeolites leading to the formation of larger (meso-)pores in zeolite crystals[8].

Advances in zeolite nucleation/crystal growth mechanism in organic template-free hydrogel system[9,10] lead to the fine tuning of zeolite crystal size including the synthesis of ultra-small (10-15 nm) crystals, all under commercially viable conditions[11]. Zeolite nanocrystals with a size below 100 nm and narrow particle size distribution were also obtained from organic template-containing initial systems[12-14].

However, the synthesis of nanocrystals of industrially relevant zeolites as MOR-, FER-, TON-type remains a challenge. Consequently, shortening their diffusion path lengths is currently done by post-synthesis methods[15,16]. Among the various post-synthesis approaches, biased chemical etching (steaming and acid leaching) are already used on a large scale (FCC, hydrocracking, light naphtha hydroisomerization) because of their simplicity and effectiveness[8,16,17]. They imply however additional steps in the catalyst preparation with their associated costs and safety hazards (chemicals, effluents treatment, energy consumption). In addition, chemical treatment has often a negative effect on zeolite catalysts' properties. Although the research on the preparation of zeolites with improved accessibility has been quite intense over the last 15 years, no large scale industrial applications were reported; the only exception being the "Molecular Highway™" technology developed by Rive technology, albeit still on a relatively small scale in the large FCC market[18].

This points out the difficulty to move these laboratory results to industry. An efficient and cost-effective technique to tune zeolite properties is still required to increase the potential of already commercially deployed zeolites.

Mechanochemistry is a part of solid-state chemistry were an applied mechanical force induces physical or chemical transformations[19]. This definition is quite extensive, and covers a variety of processes, ranging from rapid friction, cutting, and grinding, leading to chemical reactions (bond breaking).

Milling is often used to decrease the size of various types of solid particles. In the case of crystalline materials, including zeolites, it unfortunately provokes a partial or full loss of crystallinity [21]. To remedy this weakness, Wakihara et al. combined ball milling with secondary hydrothermal growth and recovered mechanically deteriorated crystals[22,23]. This method can be applied to different types of zeolite or zeolite-like materials and is an alternative to the "bottom-up" synthesis of nanosized zeolites[24]. Again, the method requires many additional unit operations, which is a serious drawback for large scale applications.

All these methods are applicable with probably different conditions for each zeolite, whereas the method of this invention is applicable to any zeolite with relatively little difficult in determining the conditions.

The invention, therefore, proposes a heating-free and chemical-free method that prevents the aforementioned drawbacks, notably by applying constant pressure to micron-size zeolites or zeolite-like materials to nanosized particles, and more particularly to method consisting of applying static pressure to zeolite-type crystals or agglomerates thereof.

SUMMARY

Consequently, the present invention relates to a post-synthetic downsizing zeolite-type crystals and/or agglomerates thereof to nanosized particles of zeolite or zeolite-like, consisting of a heating-free and chemical-free application of a static pressure to said zeolite crystals and/or agglomerates, wherein the pressure is comprised between 1 MPa and 2000 MPa and the duration of the pressing is comprised between 1 and 60 minutes. The disintegration of zeolite crystals/agglomerates is not efficient at a pressure lower (lower than 1 MPa), while higher pressures (higher than 2000 MPa) lead to amorphization and partial loose of the intrinsic properties of zeolite.

By "zeolite-type material", it is meant in the sense of the present invention either a zeolite (in the classical meaning of porous aluminosilicate) or a zeolite-like material (in the sense of a crystalline microporous material).

The method of the invention (that is also called herein after "pressing" method) allows the downsizing of micron-size zeolites crystals to nanosized particles and increases the accessibility of their active sites. This method is hereinafter referred to as "pressing" since it requires the application of static pressure on zeolite crystals.

The basis of this technique relies on the ubiquitous presence of high strain defect zones in zeolite crystals making them less resistant to external stress than their highly crystalline and defect-free domains. In addition, the intergrowths between individual crystallites are also ubiquitous in zeolites as they result from spontaneous nucleation in highly saturated hydrogel systems[25]. Apparently perfect single zeolite crystals contain small misoriented crystalline domains with interdomain borders in MFI[26] structures with different compositions and particle sizes as well as in FER[26], MOR and other zeolites. These features can be used to segment zeolite crystals to their ultimate components. As extensive milling leads to the amorphization of zeolite crystals, it seems appropriate to explore the application of a static pressure to break the weakest zones in a solid without destroying their highly crystalline parts.

Advantageously, the pressure is about 1000 MPa (for instance 950 MPa).

Advantageously, the duration of the pressing may be 10 minutes. The disintegration of zeolite crystals/agglomerates is not efficient at a much shorter time (1 to 2 minutes), while much longer time (60 minutes) leads to amorphization and loose of the intrinsic properties of zeolite.

The method of the invention can be substantially improved by using special equipment to apply an isostatic pressure (i.e. by applying the pressure to the zeolite crystals zeolite crystals from all directions) or different pressures in specific directions.

According to another embodiment, the pressing may be generated by ramping up the pressure.

Advantageously, the zeolite-type crystals may be needle-like crystals of zeolite or zeolite-like material, notably needle-like crystals of an aluminosilicate zeolite.

However, the method of the invention can be applied to different types of zeolites no matter their morphology and chemical composition, for instance of (silico)aluminophosphate zeolite.

Preferably, the zeolite or the zeolite-like materials may be chosen among ZSM-22, ZSM-23, ZSM-5, Mordenite, zeolite A, zeolite L, zeolite Y, and SAPO-34.

The present invention also relates to nanosized particles of zeolite-type material capable of being obtained by the method of the invention.

Finally, the present invention also relates to the use of the nanosized particles of zeolite-type material capable of being obtained by the method of the invention, as a catalyst for heterogeneous catalyst or as molecular sieve or as a cation exchanger.

ZSM-22, as well as ZSM-23 are excellent bi-functional (acid and metals provided by the zeolite and Pt/Pd, respectively) catalysts for the selective hydroisomerization of long-chain paraffins found in middle distillates (ca. 12-20 carbon atoms) and lubes (ca. 20-50 carbon atoms) so their mono-branched isomers. These isomers are the good compromise to optimize products properties wish opposite requirements: good quality middle distillates (cetane number CN) and lubes (viscosity index VI) require linear paraffins while their cold flow properties (cloud, pour and cold filter pouring [CFPP] points) require branched paraffins. The outstanding mono-branching yields of these catalysts is due to pore-mouth catalysis, i.e. catalysis takes place at the entrance of the pores and avoids undesirable consecutive reactions (multiple branching easily followed by cracking) favored inside the micropores; the concentration of pore mouths in ZSM-22 based catalysts determines its activity in paraffins hydroisomerization[26]. Recently, the impact of caustic leaching of ZSM-22 showed that dissolution along the normal to c axis has an important and positive effect on its catalytic activity in short (n-octane) and longer (n-decane, n-dodecane and pristane) paraffin conversion[29,30].

BRIEF DESCRIPTION OF THE FIGURES

Other advantages and features of the present invention will result from the following description given by way of non-limiting example and made with reference to the accompanying drawings:

FIGS. 2a to 2f show SEM images of (a) parent and (b) 10 T pressed ZSM-22; TEM micrographs of (c, d) parent and (e, f) 10 T pressed ZSM-22 (Pressure of about 1000 MPa).

FIG. 3 shows Nitrogen adsorption isotherms (77K) of parent and 10 T pressed ZSM-22 (Pressure of about 1000 MPa).

FIG. 4 is a $^{27}Al$ MAS NMR spectra of the parent and 10 T treated ZSM-22.

FIGS. 5a to 5c show In-situ IR of parent ZSM-22 and its 10 T pressed derivative after (a) activation, (b) acetonitrile and (c) 2,6-lutidine adsorption.

FIG. 6a to 6c show monobranched isomerization yields as a function of conversion for (a) Parent and (b) 10 T samples (T 523 K, P 5 MPa and W/F° 30-71 kg·s·mol. (c) Yields of monobranched ($mbC_8$), dibranched ($dbC_8$) at maximum conversion.

FIG. 9 shows an XRD pattern of the parent modernite (i.e. not pressed) and its 10 T pressed modernite (Pressure of about 1000 MPa).

FIGS. 10A and 10B show SEM images of (a) parent and (b) 10 T modernite.

FIG. 10 shows an XRD pattern of the parent zeolite Y (i.e. not pressed) and its 5 T pressed zeolite Y (Pressure of about 590 MPa).

FIG. 21 shows an XRD pattern of the parent zeolite A (i.e. not pressed) and its 10 T pressed zeolite A (Pressure of about 980 MPa).

FIGS. 22A and 22B show SEM images of (a) parent and (b) 10 T zeolite A.

EXAMPLES

Products:
  zeolite ZSM-22 (TON-type) in the form of pellets of substantially circular shape and having an external planar surface of about 2 cm². ZSM-22 (TON-type) exhibits 1-dimensional channel system with elliptical pores (0.48×0.57 nm). The as synthesized ZSM-22 is characterized by long prismatic crystals (along the c-axis) where the 1-dimensional channels run with abundant intergrowths along the 001 plane. These features increase the diffusion path length of molecules and limit, the number of pore mouths.
  Mordenite pellets with a surface area of 2.01 cm² and a thickness of 1 mm.
  Zeolite Y pellet with a surface area of 2.01 cm² and a thickness of 1 mm.
  Zeolite A pellet with a surface area of 2.01 cm² and a thickness of 1 mm.
  Zeolite L pellet with a surface area of 2.01 cm² and a thickness of 1 mm.
  Press: hydraulic manual press Atlas™ (Specac).

Example 1: Downsizing Zeolite ZSM-22 (980 MPa)

Pressing

We prepare a zeolite ZSM-22 (TON-type) pellet with a surface area of 2.01 cm² and a thickness of 1 mm, which was subjected to a pressure of about 1000 MPa for 10 min.

Preliminary experiments have optimized the pressure (980 MPa) and time (10 min) of the treatment of the pellets in the hydraulic laboratory press.

Some of the as synthesized ZSM-22 pellets are not submitted to the method of the invention, while some of the pallets are subjected to a 10 tons pressing (corresponding to a pressure of about 1000 MPa.

Figure 1:
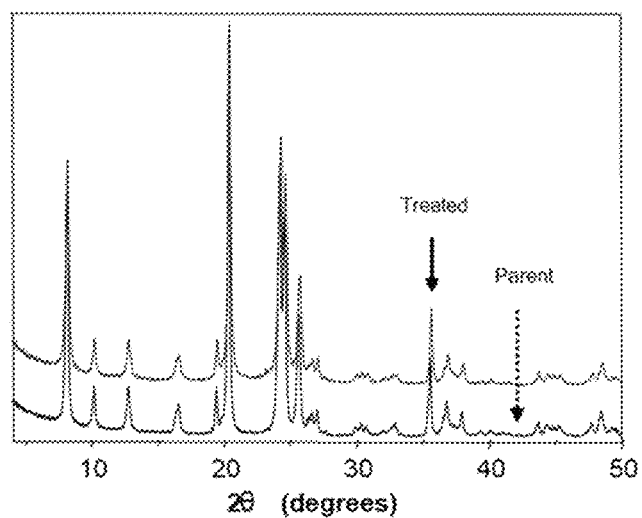
FIG. 1 shows an XRD pattern of the parent (i.e. not pressed) and its 10 T pressed ZSM-22 derivative (Pressure of about 1000 MPa).

The as-synthesized ZSM-22 that has not been subjected to pressing is hereinafter called parent P: it is pure and fully crystalline (see FIG. 1). XRD analysis of the treated sample shows a well-preserved crystallinity as shown in FIG. 1.

The as-synthesized ZSM-22 that has been subjected to pressing is hereinafter called 10 T. The 10 T pressed ZSM-22 derivative also shows a well-preserved crystallinity as shown by 1

Analysis of the Morphology

Figures 2A, 2B:
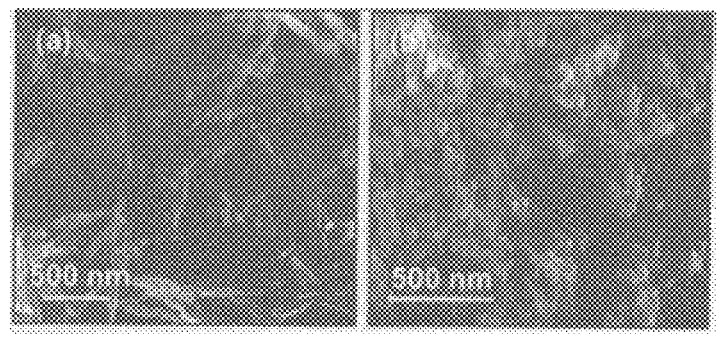

An SEM inspection shows that the parent zeolite P exhibits a long-prismatic morphology with crystal length between 0.5 and 2 micrometer (FIG. 2a). After pressing, only short-prismatic crystallites with a length of 50-200 nm are observed (FIG. 2b). More detailed information about the treatment (pressing) and its influence on the morphology of ZSM-22 is brought by TEN: Aggregates of parallel and randomly intergrown long prismatic crystals are observed in the parent P zeolite (FIG. 2c).

Figures 2C, 2D:
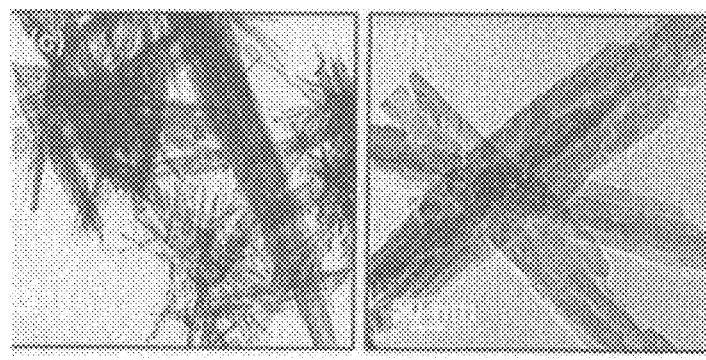

A closer look indicates that the long prismatic crystals consist of segments ranging from 50 to several hundred nanometers (FIG. 2d).

TEM analysis confirms that after pressing, only short prismatic crystals are present (FIGS. 2e, 2f). They agglomerate along the long crystal axis, and almost all individual crystals have disappeared. It is worth noting that the crystals are stacked along their prismatic face, free of pore opening, and thus their agglomeration does not have a negative impact on their pore mouth accessibility.

Determination of the Surface and Textural Properties

The surface and textural properties of the parent (P) and pressed (10 T) ZSM-22 samples are measured by nitrogen physisorption. The samples were degassed under vacuum at 573 K for 15 hours prior to the measurement. The analysis was performed at 77K using Micrometrics ASAP 2020 volumetric adsorption analyser.

The parent (P) ZSM-22 sample exhibits the typical (type 1) isotherm of microporous materials (as shown by FIG. 3). The slight inclination of the isotherm and the hysteresis loop at high relative pressure indicates the presence of mesoporosity.

The isotherm of its 10 T pressed derivative is similar except for a much larger hysteresis loop; its mesopore volume almost doubles, from 0.13 to 0.25 $cm^3g^{-1}$ as shown by Table below,

TABLE 1

Physiochemical properties of parent and treated samples

| Sample | Si/Al$^a$ (wt. %) | Pt$^b$ (%) | $S_{BET}{}^c$ ($m^2g^{-1}$) | $V_{mic}{}^c$ ($cm^3g^{-1}$) | $V_{meso}{}^c$ ($cm^3g^{-1}$) |
|---|---|---|---|---|---|
| P | 336 | 0.50 | 290 | 0.120 | 0.13 |
| 10T | 339 | 0.49 | 280 | 0.115 | 0.25 |

$^a$ICP-AES;
$^b$Platinum dispersion measured by CO adsorption;
$^c$N$_2$ adsorption: BET and t-plot methods.

Thus a 10 T pressing of the micron-sized zeolite crystals produces heavily aggregated nanoparticles. The H1 type hysteresis loop indicates the presence of a narrow range textural mesoporosity[31], which is a consequence of the alignment of nanosized particles along their long axis. The physisorption analysis fully confirms the TEM observations and indicates that the intrinsic characteristics of ZSM-22 are preserved. The negligible loss of micropore volume, from 0-0.120 to 0.115 cm$^3$g$^{-1}$ (see Table 1) is in the range of experimental error and confirms the XRD conclusion that crystalline structure is preserved.

The impact of pressing on the short-range order in the zeolite structure and inure precisely on its active sites (due to the presence of tetrahedrally coordinated aluminum atoms) is best studied by $^{27}$Al MAS NMR (FIG. 4). Both, the parent (P) and its pressed derivative (10 T) exhibit a single peak at 55 ppm, characteristic of tetrahedrally coordinated aluminum (AlO$_4$). However, a slight peak broadening is observable in the treaded sample. This broadening is assigned to distorted tetrahedrally coordinated Al caused by minor framework alterations such as Al—O—Si angle or quadrupolar interactions[32]. This effect may be attributed to an increased fraction of pore openings due to the segmentation of crystals perpendicular to their c axis and/or the surface interactions between pressed nanoparticles. In both cases, the ZSM-22 does not posses any visible octahedral Al, another indication that crystal structure is barely affected by the pressing.

In-situ IR spectroscopy of probe molecules is used to evaluate their accessibility to the active sites in the parent ZSM-22 and its 10 T pressed derivative[34, 35]. The IR spectra of the bare zeolites after activation (prior to the adsorption of probe molecules) show the expected surface silanols (3746 cm$^{-1}$) and acidic bridged hydroxyls (3604 cm$^{-1}$) (see FIG. 5a). The intensity of the silanols is similar in the two samples, while the bridged hydroxyls concentration slightly increases after the post-synthetic modification (from 94 µmol g$^{-1}$ to 109 µmol g$^{-1}$), indicating an increased concentration of Brønsted acid sites in the 10 T sample. The overall acidity is assessed by monitoring the adsorption of deuterated acetonitrile (Figure b). This small molecule easily accesses all Brønsted (2298 cm$^{-1}$) and Lewis (2326 cm$^{-1}$) acid sites. A higher number of active sites (BAS=279 µmol g$^{-1}$, LAS=163 µmol g$^{-1}$) is measured on the treated ZSM-22 than on its parent (BAS=235 µmolg$^{-1}$ and LAS=151 µmol g$^{-1}$). The increased accessibility is not accompanied by the formation of Lewis acid sites, in agreement with the absence of octahedral species in $^{27}$Al NMR. The bulky and sterically hundred lutidine probes only the Brønsted sites (1642 cm$^{-1}$) located on the outer surface and the pore mouths. (Figure c).

These data indicate that the eternal acidity in the 10 tons pressed ZSM-22 (88 µmol g$^{-1}$) is slightly higher than its parent sample (77 µmol g$^{-1}$).

Evaluation of the Catalytic Performances

The effect of this post-synthetic modification on the catalytic performances of ZSM-22, is evaluated in hydroisomerization of n-octane (n-C$_8$). 0.5 wt % Pt is impregnated on the two zeolites using Pt(NH$_3$)$_4$(NO$_3$)$_2$ as a Pt source. The Pt dispersions are similar (ca. 52%) for both samples providing that only the number of Brønsted acid sites determines catalytic activity[36].

The platinum loaded ZSM-22, Pt-P, and Pt-10 T for the parent ZSM-22 and its 10 T pressed derivative, have both a high conversion in the n-C$_8$ hydroisomerization (FIG. 6a,b). The activity of the Pt-10 T catalyst, 67%, is however higher than its parent Pt-P, 44%. This 23% increase in conversion takes place without barely any cracking (1.94%) and no changes in branching selectivity; yields of mono-methyl branched isomers, under identical operating conditions, thus increase from 43% (parent) to a remarkable 65% (10 T derivative), FIG. 6c.

Similar yields of mono-branched isomers were reported earlier, albeit at different experimental conditions (temperature, total pressure and space time)[29,36]. The high isomerization yields and low cracking of the pressed SM-22 confirm that, this process improves the key physical properties, increases the number of pore mouths, of optimal catalyst design. In the case of ZSM-22, it does so without some of the drawbacks of caustic leaching, where i) 40 to 8.0% of ZSM-22 are dissolved without any great increase in mesoporous surface, in contrast to other 3-dimensional zeolites (MFI, FER), and ii) caustic leaching needs to be followed by a (mild) acid leaching to solubilize Al species blocking access to the micropores.

Example 2: Comparative Example Zeolite ZSM-22

Pressing

We prepare a zeolite ZSM-22 pellet with a surface area of 2.01 cm$^2$ and a thickness of 1 mm, which was subjected to a pressure of about 2452 MPa (25 T) for 10 min.

Analysis of the Morphology and Properties

Figure 7:
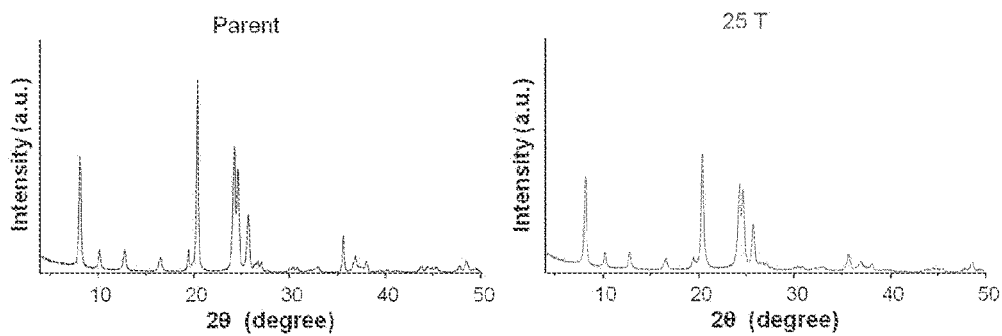
FIG. 7 shows the XRD pattern of the parent (left) and 251 treated (right) ZSM-22. A decrease in the intensity of XRD peaks of treated material can be observed.
Figure 8:
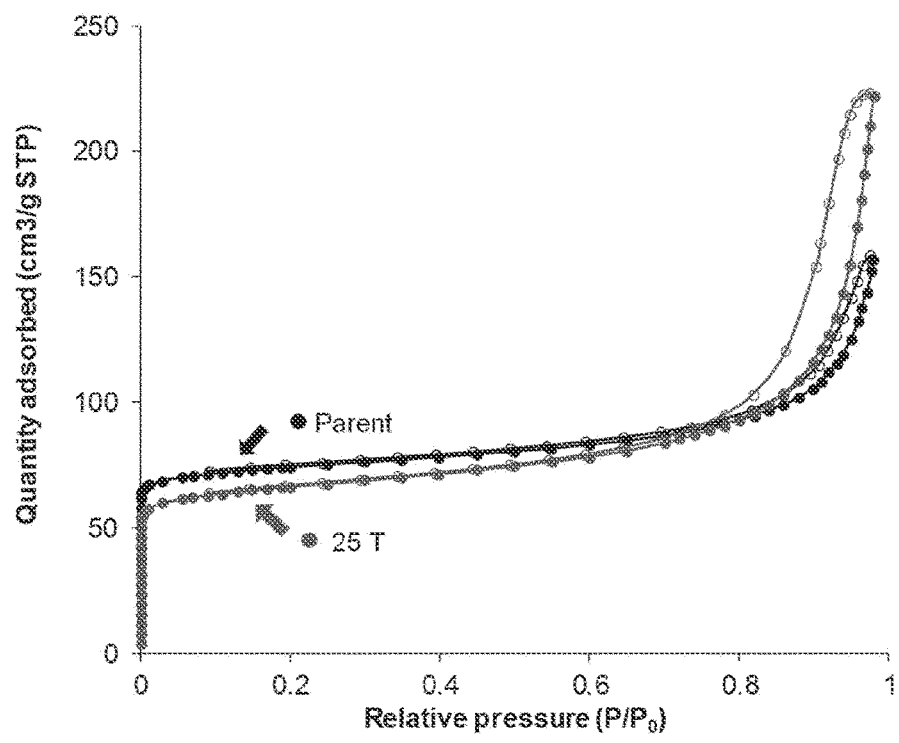
FIG. 8 shows the $N_2$ adsorption-desorption isotherms of the parent and the 251 treated ZSM-22. The chances in the isotherm reveal a decrease the micropore volume and increase in the mesopore volume, the later being a consequence of the agglomeration of broken nanosized particles.

XRD analysis of the treated sample snows a decrease of crystallinity as shown in FIG. 7. N$_2$ physisorption analysis confirmed the results of XRD study showing a decrease in the uptake a low relative pressure, Which is due to the amorphisation and loose of a part (~15%) of the micropore volume as can be seen in FIG. 8.

Example 3: Downsizing Mordenite (980 MPa)

Pressing

We prepare a Mordenite pellet with a surface area of 2.01 cm$^2$ and a thickness of 1 mm, which was subjected to a pressure of about 980 MPa for 10 min.

The as-synthesized Mordenite that has not been subjected to pressing is hereinafter called parent P: it is pure and fully crystalline (see FIG. 9). The as-synthesized Mordenite that has been subjected to pressing is hereinafter called 10 T. The 10 T pressed Mordenite derivative also shows a well-preserved crystallinity as shown in FIG. 9.

Analysis of the Morphology and Properties

The SEM inspection of the parent and treated mordenite showed the difference in the particle size. The treated sample exhibit smaller crystals, which are a consequence of breaking the Mordenite crystals during pressure treatment (see FIGS. 10A and 10B).

Figure 11:
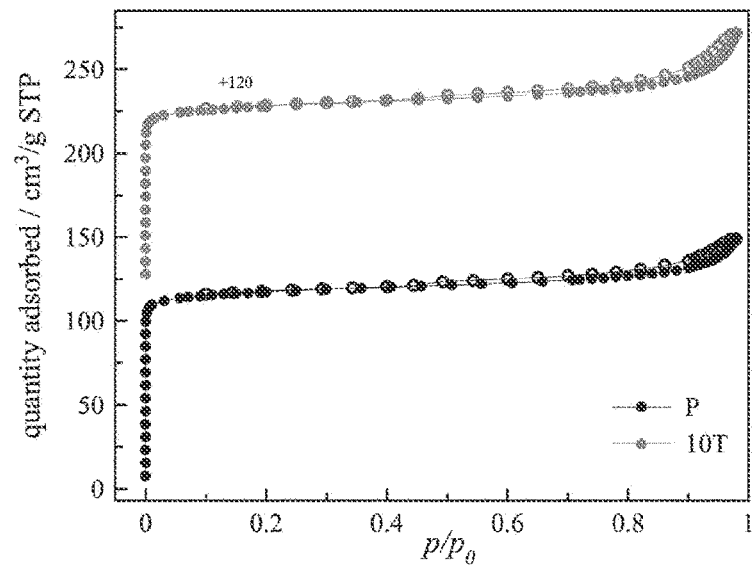
FIG. 11 shows Nitrogen adsorption isotherms of parent and 10 T pressed mordenite (Pressure of about 1000 MPa).

The porous characteristics of initial and treated Mordenite were evaluated by N$_2$ physisorption. No substantial differences in the physisorption isotherms where observed (see FIG. 11).

Example 4: Downsizing Mordenite (590 MPa)

Pressing

We prepare a Mordenite pellet with a surface area of 2.01 cm$^2$ and a thickness of 1 mm, which was subjected to a pressure of about 590 MPa for 10 min.

Figure 12:
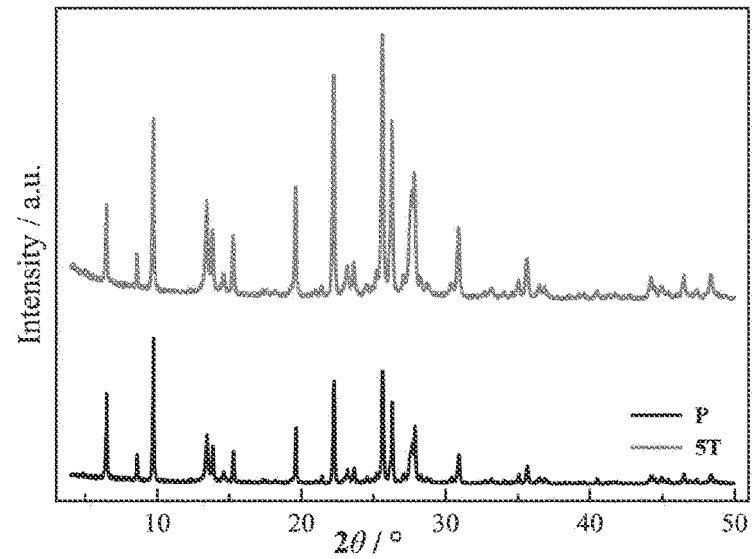
FIG. 12 shows an XRD pattern of the parent modernite (i.e. not pressed) and its 5 T pressed modernite (Pressure of about 600 MPa).

The as-synthesized Mordenite that has not been subjected to pressing is hereinafter called parent P: it is pure and fully crystalline (see FIG. 12). The as-synthesized Mordenite that has been subjected to pressing is hereinafter called 5 T. The 5 T pressed Mordenite derivative also snows a well-preserved crystallinity as shown in FIG. 12.

Analysis of the Morphology and Properties

Figures 13A, 13B:
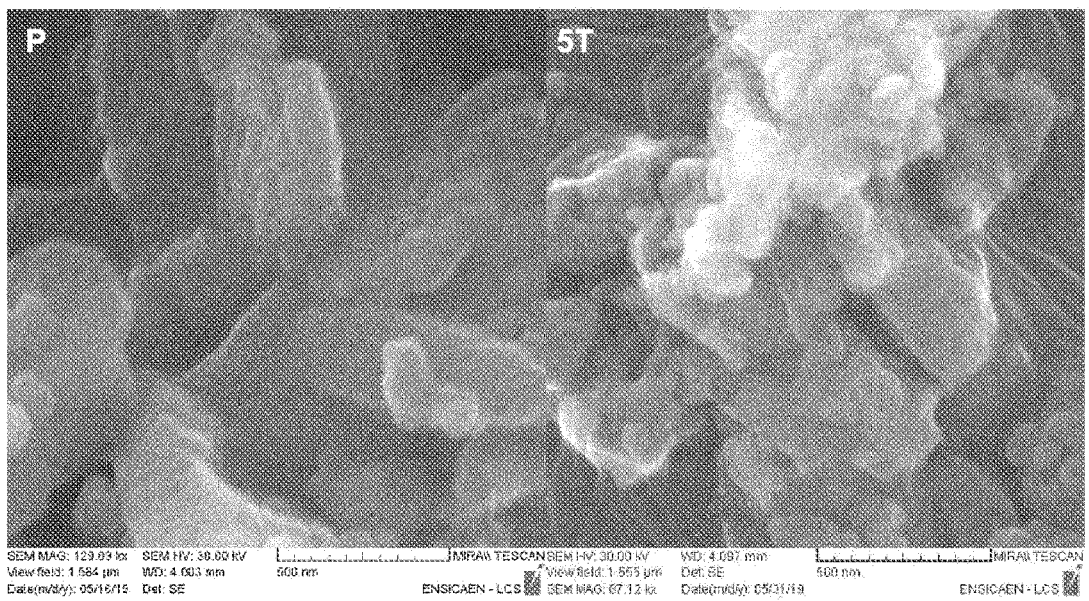
FIGS. 13A and 13B show SEM images of (a) parent and (b) 5 T modernite.

The SEM inspection of the parent and treated mordenite showed the difference in the particle size. The treated sample exhibit smaller crystals which are a consequence of breaking the Mordenite crystals during pressure treatment (see FIGS. 13A and 13B).

Figure 14:
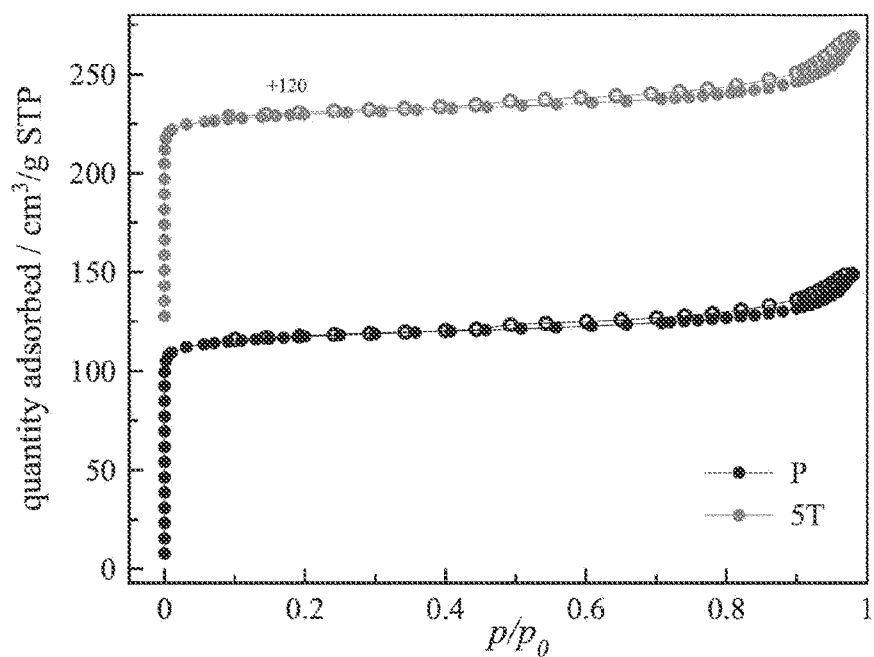
FIG. 14 shows Nitrogen adsorption isotherms of parent and 5 T pressed mordenite (Pressure of about 600 MPa).

The porous characteristics of initial and treated Mordenite were evaluated by $N_2$ physisorption. No substantial differences in the physisorption isotherms where observed (see FIG. 14).

Example 5: Downsizing Zeolite Y (980 MPa)

Pressing

We prepare a zeolite Y pellet with a surface area of 2.01 cm² and a thickness of 1 mm, which was subjected to a pressure of about 980 MPa for 10 min.

Figure 15:
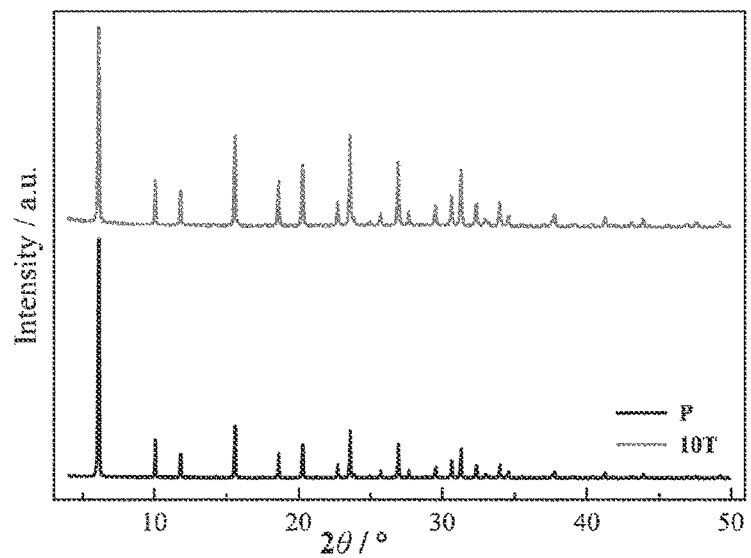
FIG. 15 shows an XRD pattern of the parent zeolite Y (i.e. not pressed) and its 10 T pressed zeolite Y (Pressure of about 980 MPa).

The as-synthesized zeolite Y that has not been subjected to pressing is hereinafter called parent P: it is pure and fully crystalline (see FIG. 15). The as-synthesized zeolite Y that has been subjected to pressing is hereinafter called 10 T. The 10 T pressed zeolite Y derivative also shows a well-preserved crystallinity as shown in FIG. 15.

Analysis of the Morphology and Properties

Figures 16A, 16B:
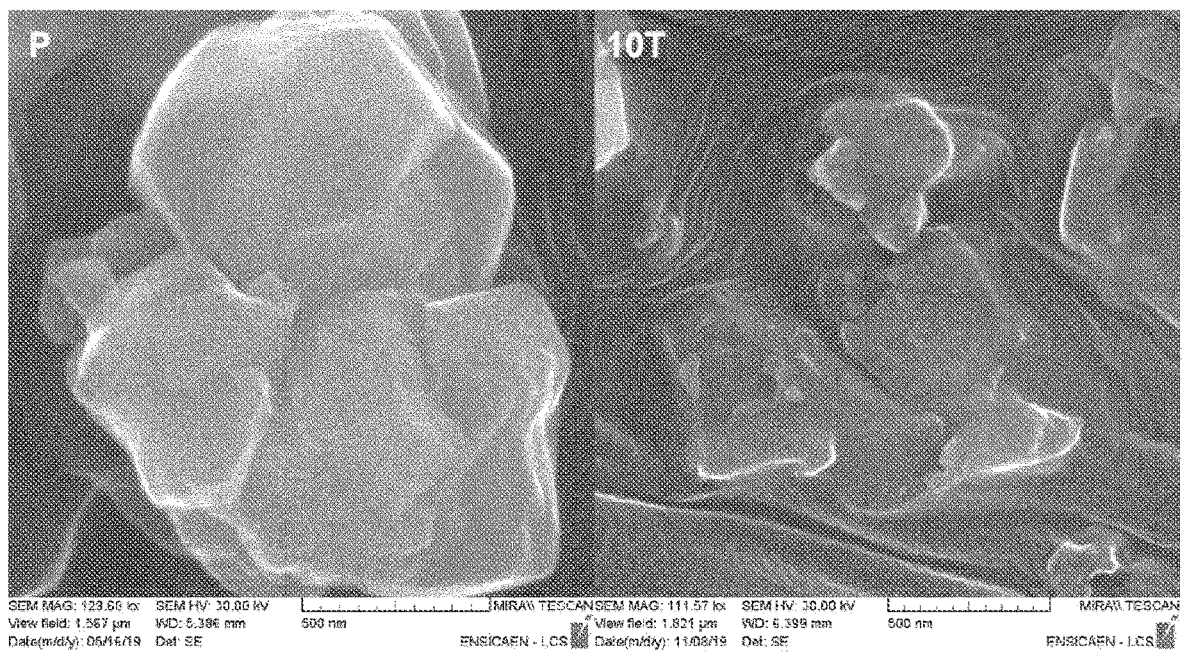
FIGS. 16A and 16B show SEM images of (a) parent and (b) 10 T zeolite Y.

The SEM inspection of the parent and treated mordenite showed the difference in the particle size. The treated sample exhibit smaller crystals which are a consequence of breaking the zeolite Y crystals during pressure treatment (see FIGS. 16A and 16B).

Figure 17:
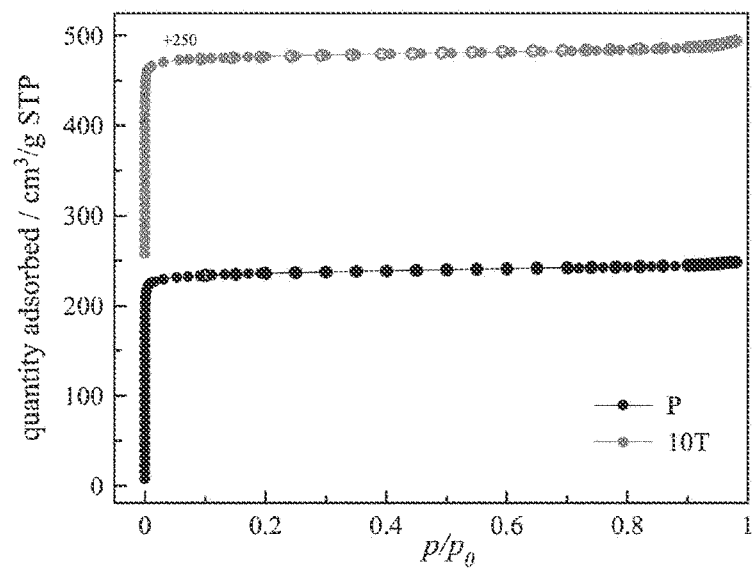
FIG. 17 shows Nitrogen adsorption isotherms of parent and 10 T pressed zeolite Y (Pressure of about 980 MPa).

The porous characteristics of initial and treated zeolite Y were evaluated by $N_2$ physisorption. No substantial differences in the physisorption isotherms where observed (see FIG. 17).

Example 6: Downsizing Zeolite Y (590 MPa)

Pressing

We prepare a zeolite Y pellet with a surface area of 2.01 cm² and a thickness of 1 mm, which was subjected to a pressure of about 590 MPa for 10 min.

Figure 18:
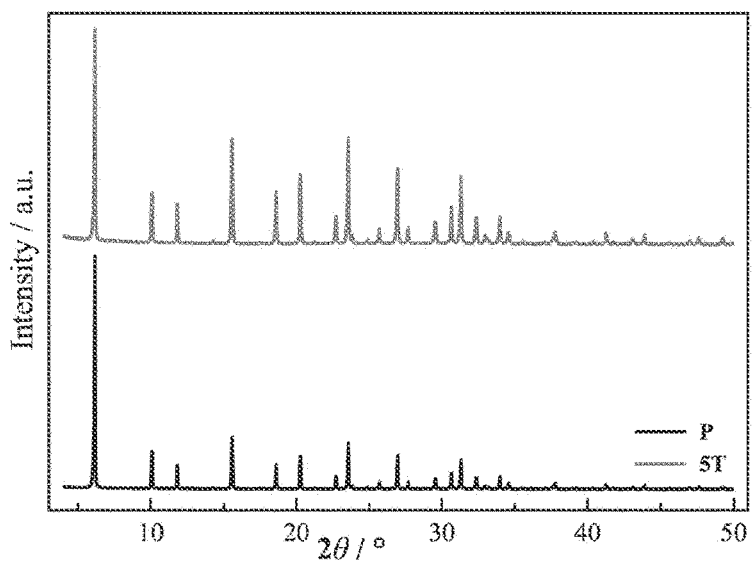

The as-synthesized zeolite Y that has not been subjected to pressing is hereinafter called parent P: it is pure and fully crystalline (see FIG. 18). The as-synthesized zeolite Y that has been subjected to pressing is hereinafter called 5 T. The 5 T pressed zeolite Y derivative also shows a well-preserved crystallinity as shown in FIG. 18.

Analysis of the Morphology and Properties

Figures 19A, 19B:
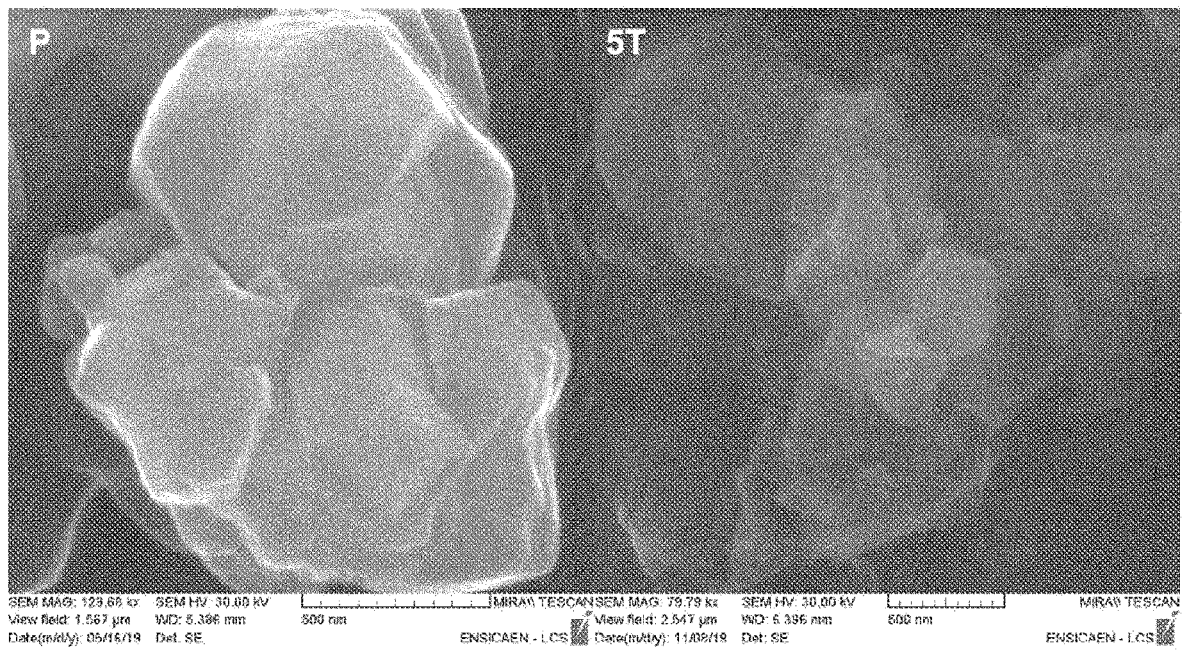
FIGS. 19A and 19B show SEM images of (a) parent and (b) 5 T zeolite Y.

The SEM inspection of the parent and treated mordenite showed the difference in the particle size. The treated sample exhibit smaller crystals which are a consequence of breaking the zeolite Y crystals during pressure treatment (see FIGS. 19A and 19B).

Figure 20:
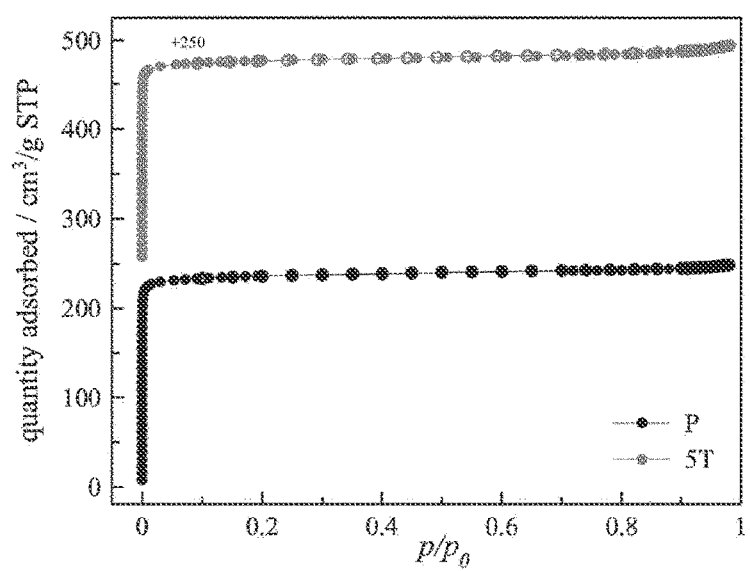
FIG. 20 shows Nitrogen adsorption isotherms of parent and 5 T pressed zeolite Y (Pressure of about 590 MPa).

The porous characteristics of initial and treated zeolite Y were evaluated by $N_2$ physisorption. No substantial differences in the physisorption isotherms where observed (see FIG. 20).

Example 7: Downsizing Zeolite A (980 MPa)

Pressing

We prepare a zeolite A pellet with a surface area or 2.01 cm² and thickness of 1 mm, which was subjected to pressure of about 980 MPS for 10 min.

The as-synthesized zeolite A that has not been subjected to pressing is hereinafter called parent P: it is pure and fully crystalline (see. FIG. 21). The as-synthesized zeolite A that has been subjected to pressing is hereinafter called 10 T. The 10 T pressed zeolite Y derivative also shows a well-preserved crystallinity as shown in FIG. 21.

Analysis of the Morphology and Properties (Physisorption)

The SEM inspection of the parent and treated mordenite showed the difference in the particle size. The treated sample exhibit smaller crystals which are a consequence of breaking the zeolite A crystals during pressure treatment (see FIGS. 22A and 22B).

Figure 23:
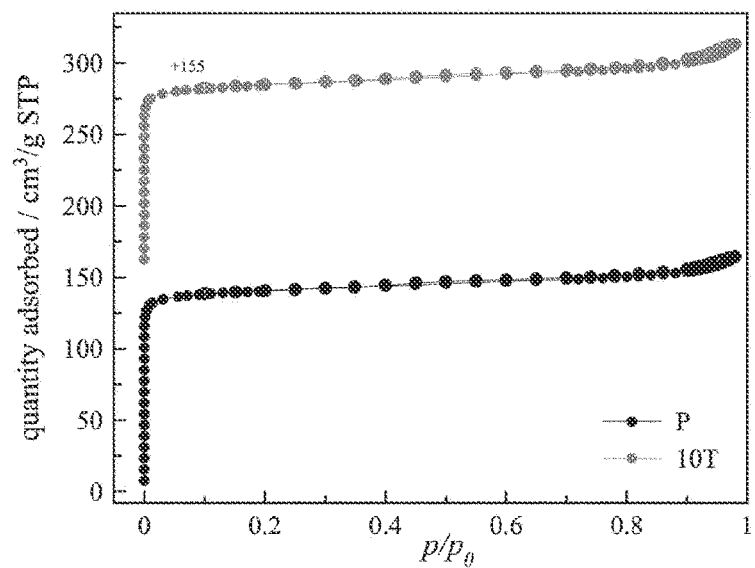
FIG. 23 shows Nitrogen adsorption isotherms of parent and 10 T pressed zeolite A (Pressure of about 980 MPa).

The porous characteristics of initial and treated zeolite A were evaluated by $N_2$ physisorption. No substantial differences in the physisorption isotherms where observed (see FIG. 23).

Example 8: Downsizing Zeolite A (590 MPa)

Pressing

We prepare a zeolite A pellet with a surface area of 2.01 cm² and a thickness of 1 mm, which was subjected to a pressure of about 590 MPa for 10 min.

Figure 24:
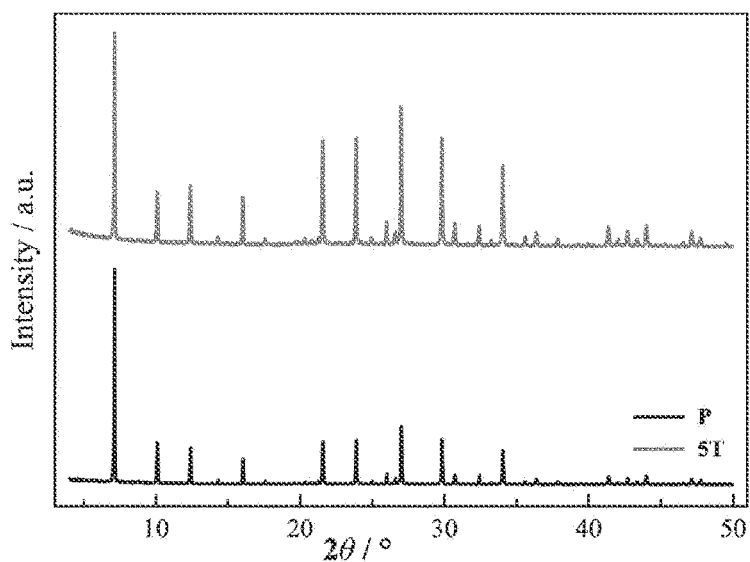
FIG. 24 shows an XRD pattern of the parent zeolite A (i.e. not pressed), and its 5 T pressed zeolite A (Pressure of about 590 MPa).

The as-synthesized zeolite A that has not been subjected to pressing is hereinafter called parent P: it is pure and fully crystalline (see FIG. 24). The as-synthesized zeolite A that has been subjected to pressing is hereinafter called 5 T. The 5 T pressed zeolite Y derivative also shows a well-preserved crystallinity as shown in FIG. 24.

Analysis of the Morphology and Properties

Figures 25A, 25B:
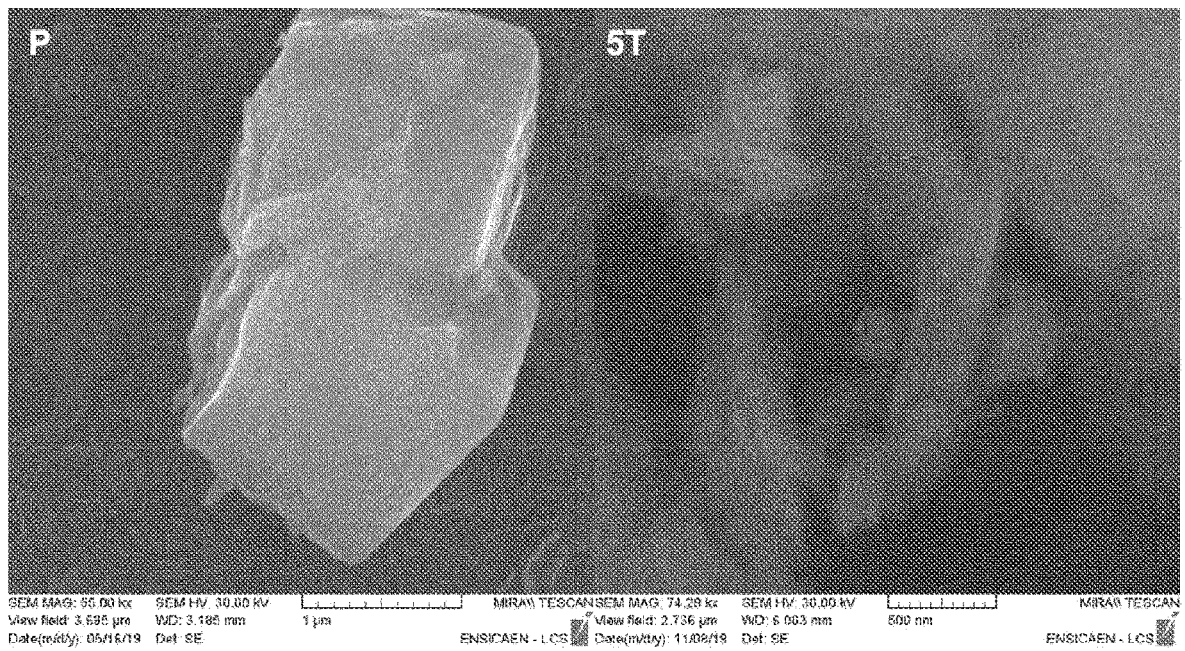
FIGS. 25A and 25B show SEM images of (a) parent and (b) 5 T zeolite A.

The SEM inspection of the parent and treated mordenite showed the difference in the particle size. The treated sample exhibit smaller crystals, which are a consequence of breaking the zeolite A crystals during pressure treatment (see FIGS. 25A and 25B).

Figure 26:
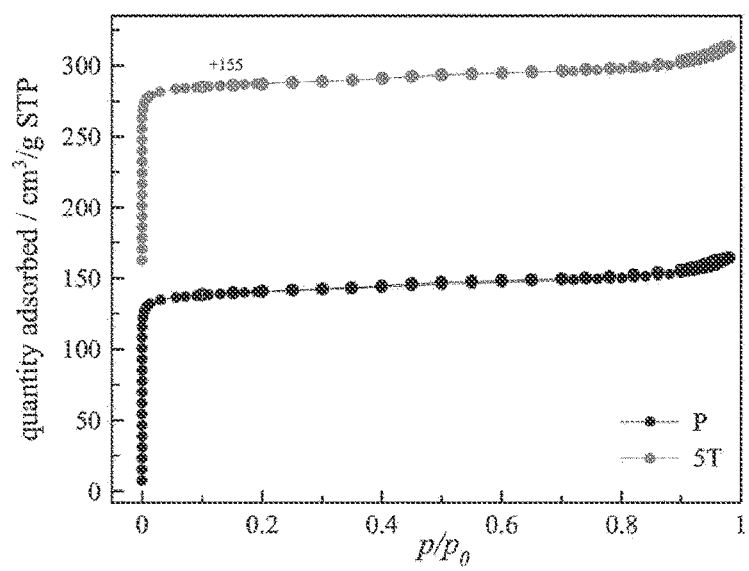
FIG. 26 shows Nitrogen adsorption isotherms of parent and 5 T pressed zeolite A (Pressure of about 590 MPA).

The porous characteristics of initial and treated zeolite A were evaluated by $N_2$ physisorption. No substantial differences in the physisorption isotherms where observed (see FIG. 26).

Example 9: Downsizing Zeolite L (980 MPa)

Pressing

We prepare a zeolite L pellet with a surface area of 2.01 cm² and a thickness or 1 mm, which was subjected to a pressure of about 980 MPa for 10 min.

Figure 27:
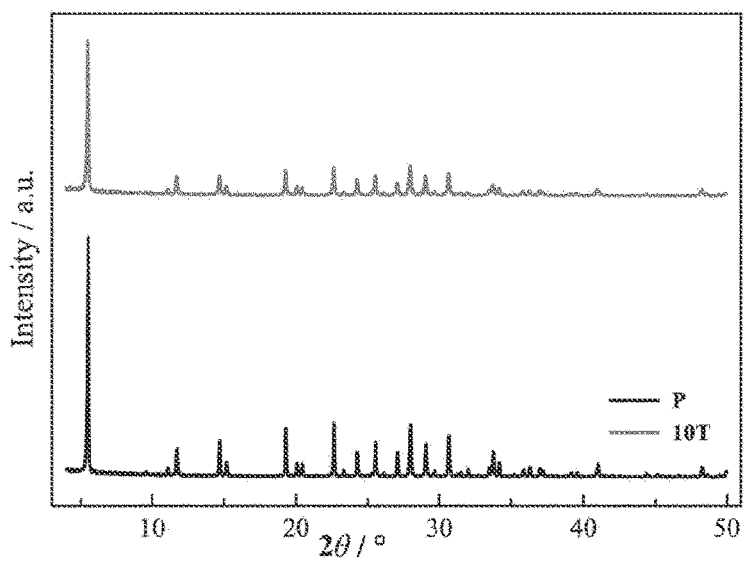
FIG. 27 shows an XRD pattern of the parent zeolite L (i.e. not pressed) and its 10 T pressed zeolite L (Pressure of about 980 MPa).

The as-synthesized zeolite L that has not been subjected to pressing is hereinafter called parent P: it is pure and fully crystalline (see FIG. 27). The as-synthesized zeolite L that has been subjected to pressing is hereinafter called 10 T. The 10 T pressed zeolite L derivative also shows a well-preserved crystallinity as shown in FIG. 27.

Analysis of the Morphology and Properties

Figures 28A, 28B:
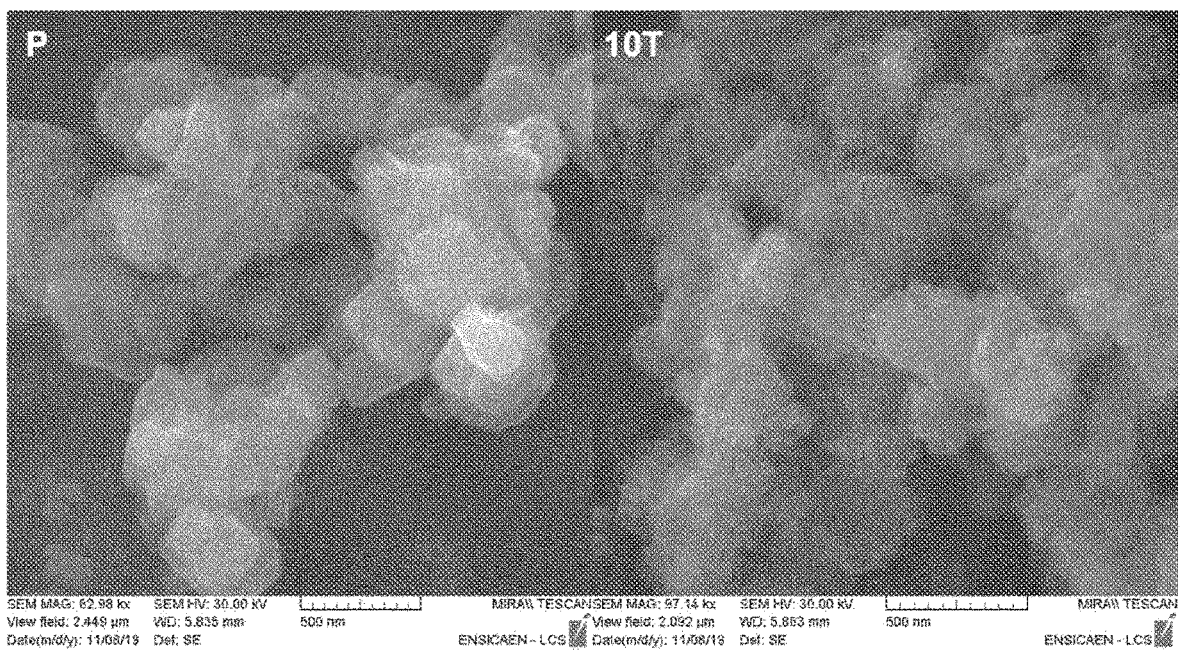
FIGS. 28A and 28B show SEM images of (a) parent and (b) 10 T zeolite L.

The SEM inspection of the parent and treated mordenite showed the difference in the particle size. The treated sample exhibit smaller crystals which are a consequence of breaking the zeolite A crystals during pressure treatment (see FIGS. 28A and 28B).

Figure 29:
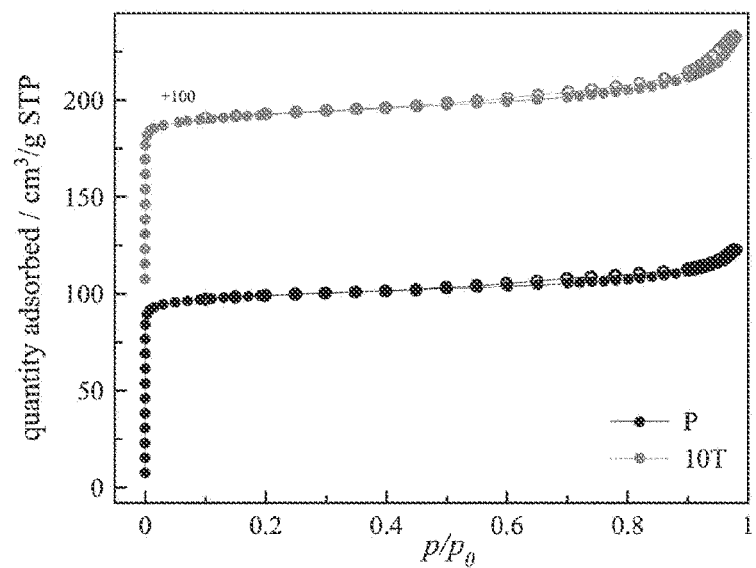
FIG. 29 shows Nitrogen adsorption isotherms of parent and 10 T pressed zeolite L (Pressure of about 980 MPa).

The porous characteristics of initial and treated zeolite L were evaluated by $N_2$ physisorption. No substantial differences in the physisorption isotherms where observed (see FIG. 29).

Example 10: Downsizing Zeolite L (590 MPa)

Pressing

We prepare a zeolite L pellet with a surface area or 2.01 cm² and a thickness of 1 mm, which was subjected to a pressure of about 590 MPa for 10 min.

Figure 30:
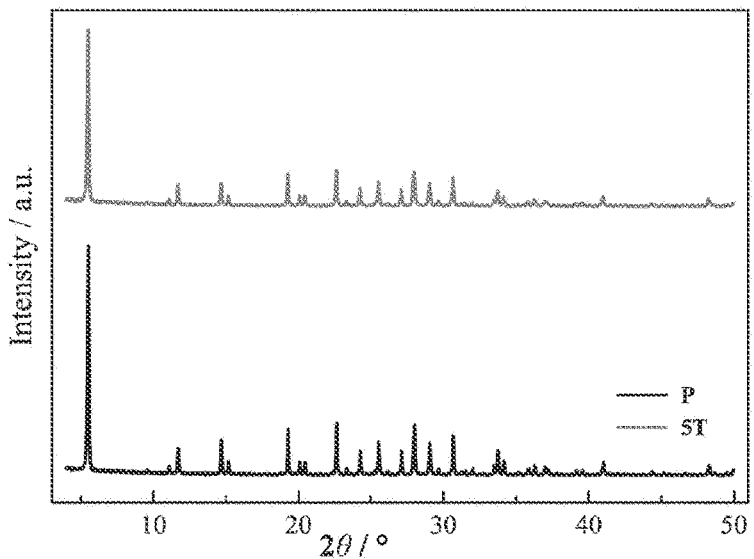
FIG. 30 shows an XRD pattern of the parent zeolite L (i.e. not pressed) and its 5 T pressed zeolite L (Pressure of about 590 MPa).

The as-synthesized zeolite L that has not been subjected to pressing is hereinafter called parent P: it is pure and fully crystalline (see FIG. 30). The as-synthesized zeolite L that has been subjected to pressing is hereinafter called 5 T. The 5 T pressed zeolite L derivative also shows a well-preserved crystallinity as shown in FIG. 30.

Analysis of the Morphology and Properties

Figures 31A, 31B:
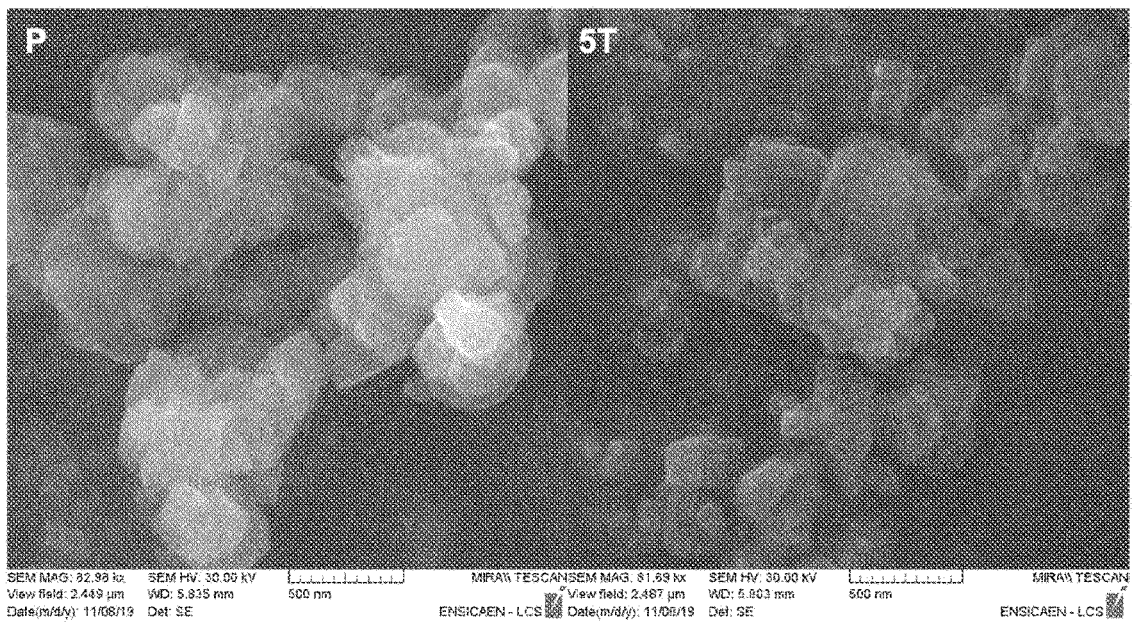
FIGS. 31A and 31B show SEM images of (a) parent and (b) 5 T zeolite L.

The Sty inspection of the parent and treated mordenite showed the difference in the particle size. The treated sample exhibit smaller crystals which are a consequence of breaking the zeolite A crystals during pressure treatment (see FIGS. 31A and 31B).

Figure 32:
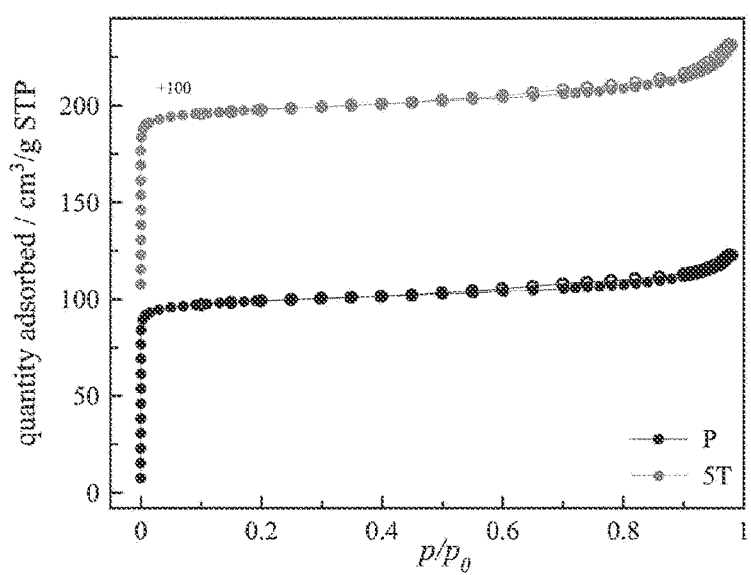
FIG. 32 shows Nitrogen adsorption isotherms of parent and 5 T pressed zeolite L (Pressure of about 590 MPa).

The porous characteristics of initial and treated zeolite L were evaluated by $N_2$ physisorption. No substantial differences in the physisorption isotherms where observed (see FIG. 32).

LIST OF REFERENCES

[1] D. W. Breck, Zeolite Molecular Sieves: Structure, Chemistry, and Use, John Wiley & Sons, New York, 1974.
[2] C. Martinez, A. Corma, Coord. Chem. Rev. 255 (2011) 1558-1580.
[3] W. Vermeiren, J. P. Gilson, Top. Catal. 52 (2009) 1131-1161.
[4] C. R. Marcilly, Top. Catal. 13 (2050) 357-366.
[5] P. B. Weisz, Chemtech 22 (1992) 424.
[6] N. Y. Chen, T. F. Degnan, C. Morris, Molecular Transport and Reaction in Zeolites, VCH, Weinheim, 1994.
[7] V. Valtchev, L. Tosheva, Chem. Rev. 113 (2013) 6734-6760
[8] J. Pérez-Ramirez, C. H. Christensen, K. Egeblad, C. H. Christensen, J. C. Groen, Chem. Soc. Rev. 37 (2008) 2530.
[9] M. Smaihi, O. Barida, V. Valtchev, Eur. J. Inorg. Chem. (2003) 4370-4377.
[10] G. Melinte, V. Georgieva, M. A. Springuel-Huet, A. Nossov, C. Ersen, F. Guenneau, A-Gedeon, A, Palèlc, K. N. Bozhilov, C. Pham-Huu, S. Qiu, S. Mintova, V. Valtchev, Chem.—A Eur. J. 21 (2015) 18316-18327.
[11] H. Awala, J. P. Gilson, R. Retoux, P. Boullay, J. M. Goupil, V. Valtchev, S. Mintova, Nat. Mater. 14 (2015).
[12] B. J. Schoeman, J. Sterte, J. E. Otterstedt, Zeolites 14 (1994) 208-216.
[13] A. E. Persson, B. J. Schoeman, J. Sterte, J. E. Otterstedt, Stud. Surf. Sei. Catal. 83 (1994) 557-567.
[14] M. A, Camblor, A. Corma, A, Mifsud, J. Perez Pariente, S. Valencia, Stud. 105 (1997) 341-348.
[15] V. Valtchev, G. Majano, S. Mintova, J. Pérez-Ramirez, Chem. Soc. Rev. 42 (2013) 263-290.
[16] Y. Wei, T. E. Parmentier, K. P. de Jong, J. Zeèevié, Chem. Soc. Rev. 44 (2015) 7224-7261.
[17] C. V. McDaniel, P. K. Maher, In Molecular Sieves, Society of Chemical Industry, London, 1968.
[18] A. Sachse, J. Garcia-Martinaz, Chem. Mater. 29 (2017) 3827-3852.
[19] A. Stolle, M. Szuppa, S. E. S. Leonhardt, B. Ondruschka, Chem. Soc. Rev, 40 (2011) 2317.
[20] E. Boldyreva, Chem. Soc. Rev. 42 (2013) 7719.
[21] V. Valtchev, S. Mintova, D, Radev, V. Dimov, A. Toneva, Zeolites, 1995.
[22] T. Wakihara, K. Sato, S. Inagai, J. Tatami, K. Komeya, T. Meguro, Y. Kubota, ACS Appl. Mater. Interfaces 2 (2010). 2715-2718,
[23] T. Wakihara, R, Ichikawa, J. Tatami, Endo, K. Yoshida, Y. Sasaki, K. Komeya, T. Meguro, Cryst. Growth. Des. 11 (2011) 955-958.
[24] Z. Liu, N. Nomura, D. Nlshioka, Y. Hotta, T. Matsuo, K. Oshima, Y. Yanaba, T. Yoshikawa, K. Ohara, S. Kohara, Takewaki, T. Okubo, T. Wakihara, Chem. Commun. 51 (2015) 12567-12570.
[25] R. M. Barrer, Hydrothermal Chemistry of Zeolites, Academic Press, London, 1982.
[26] Z. Qin, G. Melinte, J. P. Gilson, M. Jaber, K. Bozhilov, P. Boullay, S. Mintova, O. Ersen, V. Valtchev, Angew. Chemie—Int. Ed. 55 (2016) 15049-15052.
[27] X. Chen, T. Todorova, Vimont, V. Ruaux, Z. Qin, J. P. Gilson, V. Valtchev, Microporous Mesoporous Mater. 200 (2014) 334-342.
[28] J. A. Martens, W. Souverijns, W. Verrelst, R. Parton, G. F. Froment, P. A. Jacobs, Angew. Chemie—Int. Ed. 34 (1994). 20-22
[29] D. Verboekend, K. Thomas, N. Milina, S. Mitchell, J. Pérez-Ramirez, J.-P. Gilson, Catal. Set. Technol, 1 (2011) 1331.
[30] J. A. Martens, D, Verboekend, K. Thomas, G. Vanbutsele, J. Pérez-Ramirez, J. P. Gilson, Catal. Today 218-219 (2013) 135-142.
[31] M. Thommes, K. A. Cychosz, Adsorption 20 (2014) 233-250.
[32] J. A. van Bokhoven, A. L. Roest, D. C. Koningsberger, J. T. Miller, P. H. Nachtegaal, A. P. M. Kentgens, J. Phys. Chem. B 104 (2000) 6743-6754.
[33] M. Hunger, G. Engelhardt, J. Weitkamp, Microporous Mater. 3 (1995) 497-510.
[34] Vimont, J. Lavalley, L. Francke, A. Demoutgues, A, Tressaud, M. Daturi, J. Phys. Chem, B 108 (2004) 3246-3255.
[35] Onfroy, G. Clet, M. Houalla, MicroporousMesoporous Mater. 82 (2005) 99-104.
[36] T. F. Degnan, C. R. Kennedy, AIChE J. 39 (1993).
[37] D. Verboekend, A. M. Chabaneix, K. Thomas, J.-P. Gilson, J. Pérez-Ramirez, CrystEngComm 13 (2011) 340.

The invention claimed is:

1. Method of post-synthetic downsizing zeolite-type crystals and/or agglomerates thereof, the method consisting in applying a static pressure to the zeolite-type crystals and/or agglomerates thereof, the static pressure being applied for 1 minute to 60 minutes, without the need of heat or chemicals, and being comprised between 590 MPa and 2000 MPa;
   whereby the zeolite-type crystals and/or agglomerates thereof are post-synthetic downsized to nanosized particles of zeolite or zeolite-like material.

2. Method according to claim 1, wherein the static pressure is 980 MPa.

3. Method according to claim 1, wherein the static pressure is applied for 10 minutes.

4. Method according to claim 1, wherein the static pressure is isostatically applied to the zeolite-type crystals from all directions.

5. Method according to claim 1, wherein the pressing is generated by ramping up the static pressure.

6. Method according to claim 1, wherein the zeolite-type crystals are needle-like crystals of zeolite or zeolite-like material.

7. Method according to claim 1, wherein the zeolite or the zeolite-like material are selected in the group consisting of ZSM-22, ZSM-23, ZSM-5, Mordenite, zeolite A, zeolite L, zeolite Y, and SAPO-34.

8. Method according to claim 1, wherein the static pressure is comprised between 980 MPa and 2000 MPa.

* * * * *